Sept. 26, 1961 　　　　　　　L. RADO 　　　　　　　3,001,348
APPARATUS FOR THE CONTINUOUS PRODUCTION OF FILLED CONTAINERS
Filed June 13, 1957 　　　　　　　　　　　　　　　　5 Sheets-Sheet 5
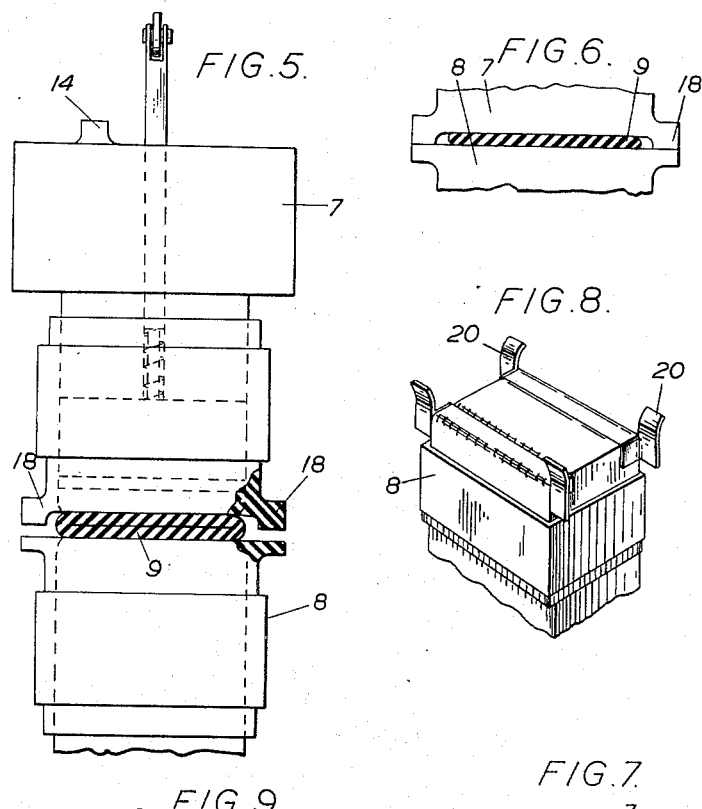
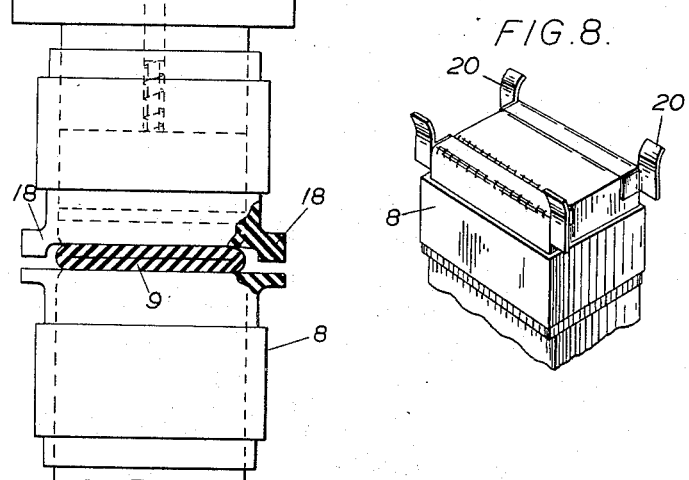
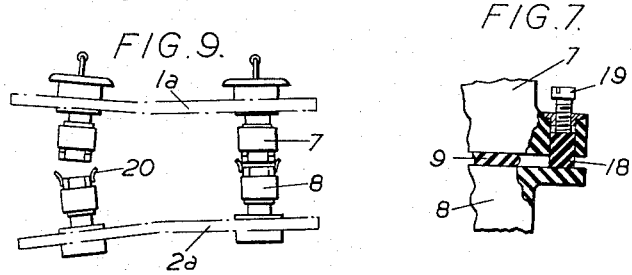
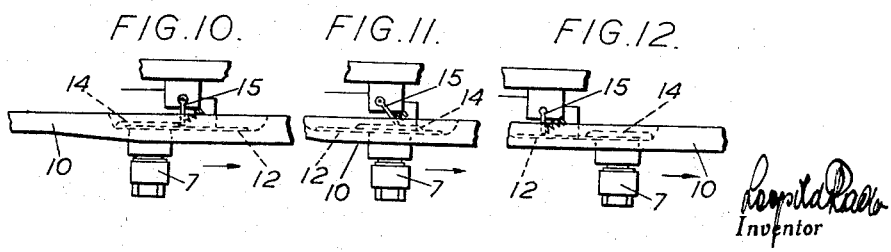
Inventor United States Patent Office 3,001,348
Patented Sept. 26, 1961

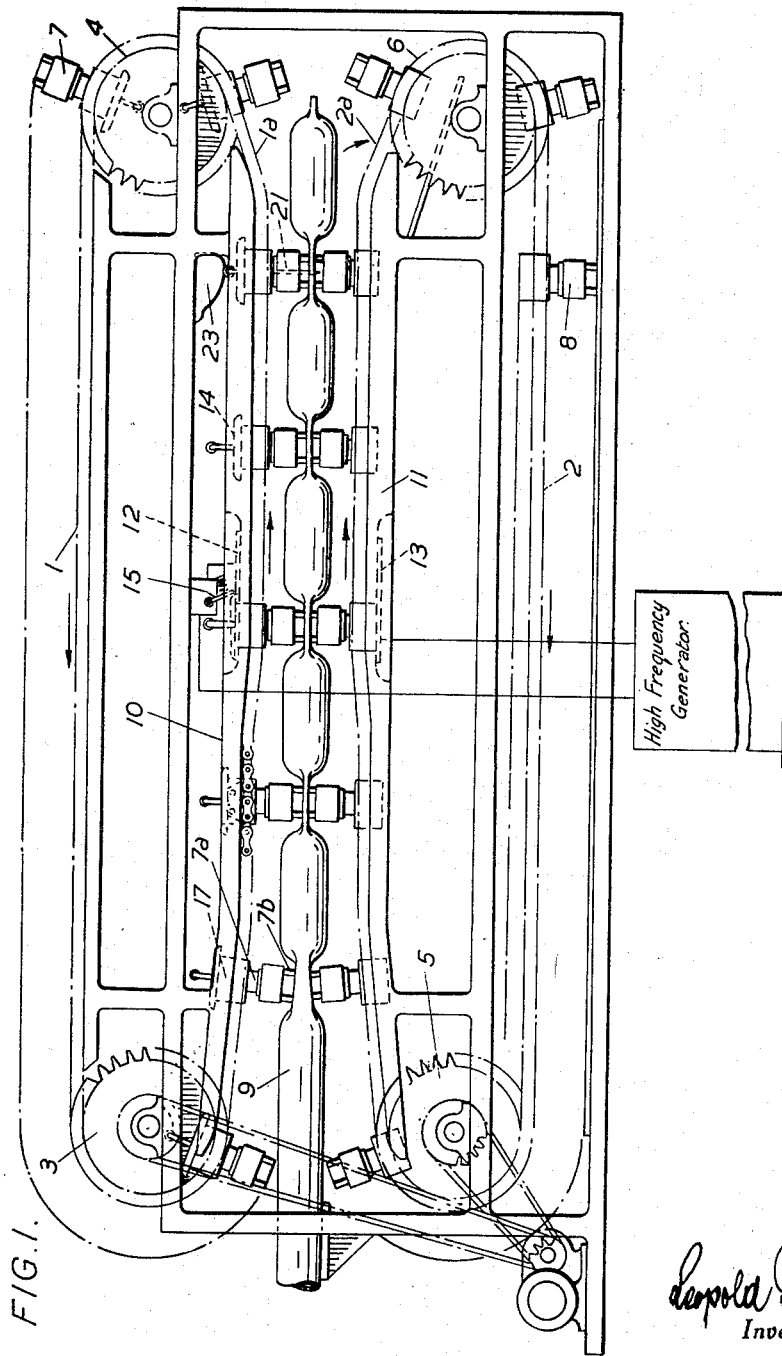

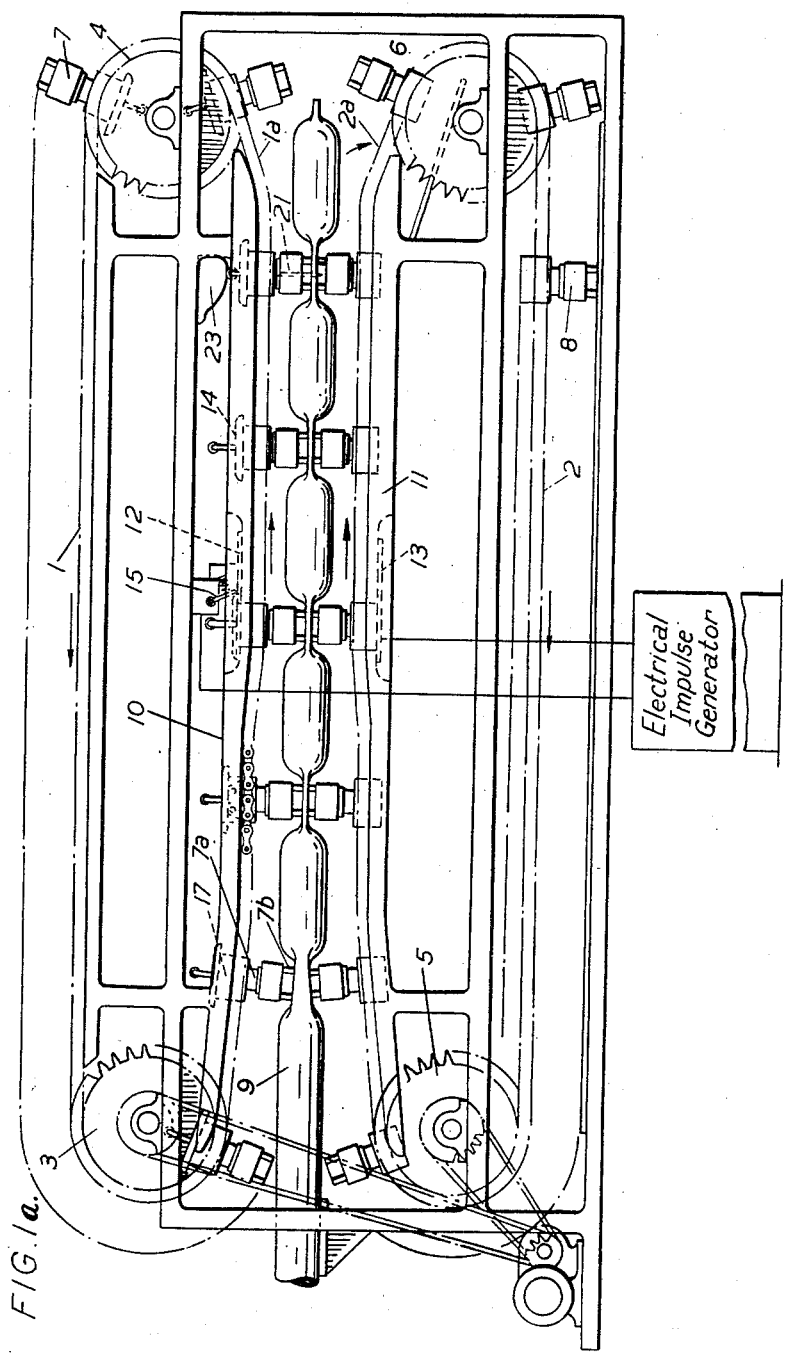

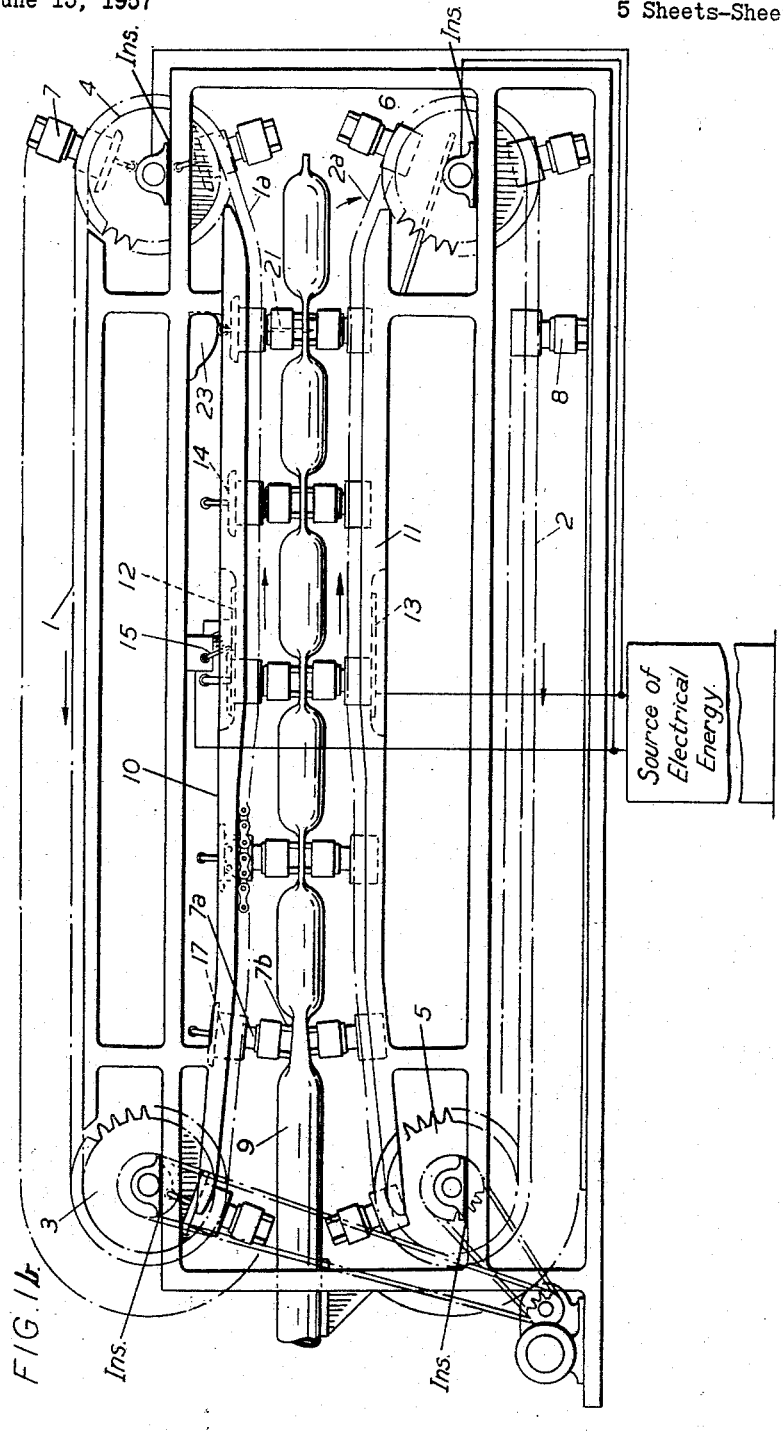

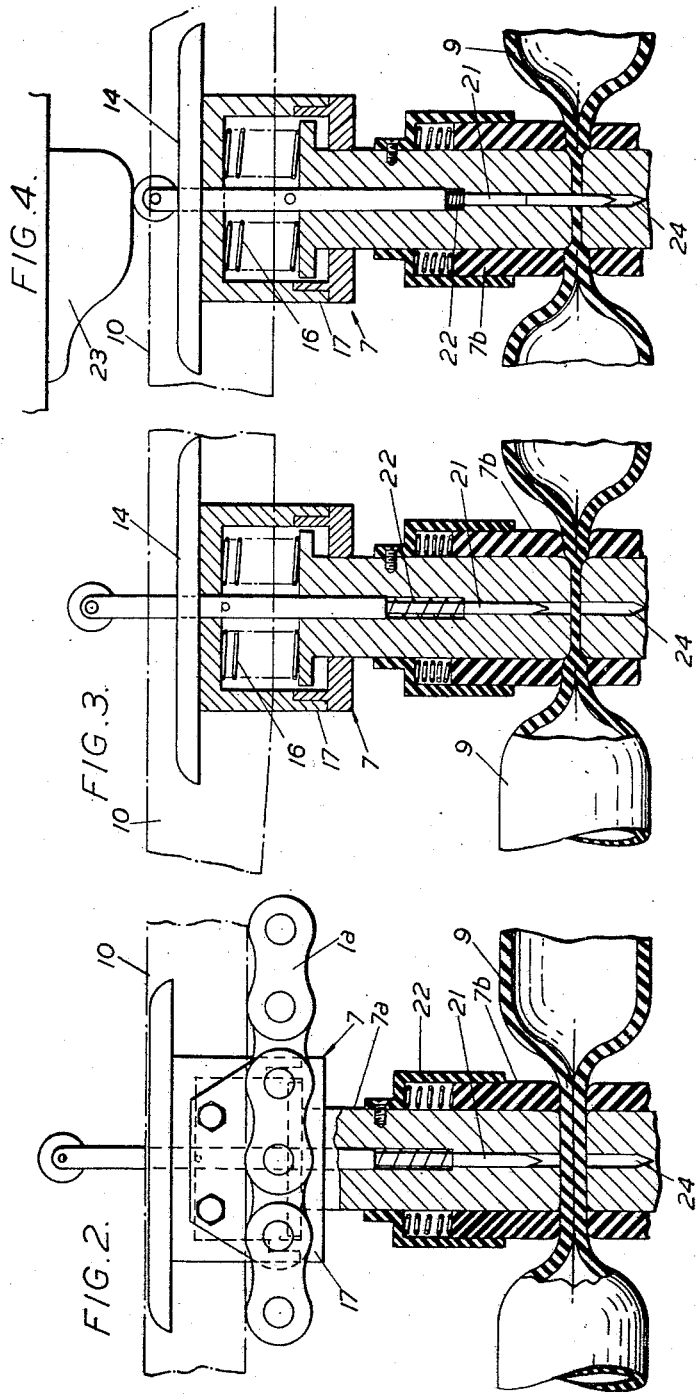

3,001,348
APPARATUS FOR THE CONTINUOUS PRODUCTION OF FILLED CONTAINERS
Leopold Rado, deceased, late of London, England, by Dorothy F. Pickering, executrix, 212 St. John St., London, England
Filed June 13, 1957, Ser. No. 665,882
7 Claims. (Cl. 53—182)

The present invention relates to apparatus for the continuous production of filled containers and is a continuation in part of co-pending patent application Serial 218,341, filed March 30, 1951, now abandoned. This invention has for its object a machine for the continuous production of pliable, filled and airtightly sealed containers formed from a tubing of at least in part thermoplastic material, which machine is characterized chiefly by the fact that it comprises a conveyor consisting of two endless conveyor members, both adapted to advance continuously at the same uniform speed and in constant direction, one strand of one conveyor member being parallel to a co-operating strand of the other conveyor member at least along a fraction of their length, rigid pressing means being transversely arranged and secured to each of the conveyor members at distances apart from one another which are equal to the length of the containers to be produced, the said pressing means being adapted to register from the strand of one to the co-operating strand of the other conveyor member, the opposed registering pressing means being caused to approach one another during their movement, so that the walls of the filled tubing introduced between them are gradually brought into close contact with one another and thereafter to continue to exert pressure on said contacting walls, means being provided for heating said pressing means or causing them to generate heat to weld together the pressed parts of the tubing during their movement, the length of the movement of the pressing means during which the pressure is maintained being greater than the length of an individual container.

The pressing means may be heated or caused to generate heat only from a point of their travel beyond that where the walls of the tubing have been brought into close contact under pressure and for a time sufficient for welding the pressed parts together.

An essential feature of the invention is that the pressing means secured to each of the conveyor members are provided transversely on said conveyor members, at distances from one another which are equal to the length of the containers to be produced. The machine may comprise guiding members for the pressing means along the strands of the conveyor members, said guiding members being provided in substantial parallelism with the co-operating parallel conveyor member strands.

Each guiding member has preferably a shape such that the pressing members carried by one co-operating strand move gradually nearer the pressing members registering therewith carried by the other co-operating strand when they are about to reach the parallel fractions of their length.

The pressure exerted by the pressing means is provided through the agency of known devices, that is, by mechanical, pneumatic, hydraulic, electro-magnetic and the like arrangements, and it is possible by known means to provide for an increase of pressure at the point at which sealing of the tube is to be performed.

The pressing members may be permanently heated either uniformly or non-uniformly, or may be heated only from a point of their travel beyond that where the walls of the tubing have been brought into close contact under pressure, said heating being applied for a time interval corresponding to a distance of travel sufficient for welding the pressed parts together.

The heating of the pressing means may be performed through electrical means, for example through resistance heating, or more especially through high frequency currents, or electrical impulses. Choice of heating means will be determined by the character of the tubing.

In the case of the heating being performed through electrical means, the pressing means on either conveyor are electrically conductive and co-operate with corresponding portions of the guiding members or with the conveyors tracks that are also electrically conductive and insulated with reference to the remainder of the guiding members, or with reference to the other track, said conductive parts being inserted in a common operative circuit.

In one embodiment of the invention, the pressing means on at least one strand are provided each with a pusher member adapted to engage a switch in the common operative circuit to close the latter only when the pressing means have entered into complete mechanical contact with the co-operating portions of the guiding members and to open said circuit before the said pressing means have reached the end of the corresponding conductive portions, and this switch may complete a circuit through which either high frequency currents or an electrical impulse may be passed.

Where the heating means employed are what is known as electric resistance heating means, that is, permanently but not necessarily uniformly heated means, the said co-operating conveyors may be electrically insulated one with respect to the other, and the means provided for the relative insulation of the presser members may be so substituted by conductive parts or contacts, which will permit of a current being passed continuously through the said resistance elements in the pressure members, and that these elements can be switched to give an increased degree of heating during that portion of their travel during which the presser members are urging the tube walls together. This mode of heating would preferably be employed where the tubing consists of a thermoplastic or at least in part thermoplastic material of such character that the application of direct heat would not cause risk of rupture of said tube, as for example where the tubing should be of fibrous nature in combination with thermoplastic material.

In a further development, the machine may be provided with a cutter member, that is normally in its receded position inside one of each pair of registering pressing means and is urged out of same and into a corresponding slot in the other registering pressing means through the welded part of the tubing held between said pressing means to sever said welded part of the tubing, said movement of the cutter member being provided by means of a cam located beyond the point of the travel of the tubing at which welding has been performed. The cutting of the welded areas of the filled tubing is executed while said areas are still held under pressure.

A better understanding of the invention will be obtained through the following detailed disclosure, given with reference to the accompanying drawings shown only as an example and in which:

FIGURE 1 is an elevation of the essential parts of the machine in accordance with the invention.

FIGURE 1a illustrates an embodiment of the invention in which the heating is performed by electrical means, in this instance by means of an electrical impulse.

FIGURE 1b illustrates an embodiment of the invention in which the heating is performed by electrical means, in this instance by means of electrical resistance heating means.

FIGURES 2, 3 and 4 are explanatory views of the pressing means while respectively pressing, welding and in this embodiment, cutting the filled tubing.

FIGURE 5 is a frontal view of two registering pressing means, one of them being provided with non-electrically conductive abutments for limiting the movements of said pressing means towards one another when the electrical heating means are constituted by the passage of high frequency currents. When heating is performed by means of electrical heat impulses, or by means of resistance heater elements, it will be understood that such abutments may be electrically conductive and may serve to close and open electrical circuits in such manner that the currents or impulses are caused to flow as and when desired.

FIGURE 6 is a similar view showing the pressing means in the position nearest to one another.

FIGURE 7 is a partial diagrammatic view of an adjustable abutment for limiting the movement of the pressing means towards one another.

FIGURE 8 is a simplified perspective view of one pressing means on one conveyor member provided with guiding portions to keep the corresponding pressing means of the other conveyor member in their correct relative position for ensuring a positive weld.

FIGURE 9 is a lateral view showing the manner in which the pressing means of one conveyor member align with the corresponding pressing means of the other conveyor member.

FIGURES 10, 11 and 12 are diagrammatic views showing how the pushing member provided on each pressing means of one conveyor member switches on and off the current as the pressing means engage and leave the conductive portion of the guiding member.

The machine illustrated in FIGURE 1 comprises chiefly two endless conveyor members 1 and 2 passing respectively over the driving wheels 3—4 and 5—6.

The strands 1a and 2a of the conveyor members 1 and 2 are parallel over a substantial portion of their length and the said two strands advance in the same direction and with the same speed.

Each conveyor member 1 and 2 carries a series of presser members 7 and 8 respectively separated from each other by lengths equal to those of the containers it is desired to obtain.

When the presser members 7 and 8 of either conveyor member are carried by the parallel strands 1a and 2a of said conveyor members by reason of their movement round the driving wheels 3—4 and 5—6, the presser members 7 move exactly in register with the presser members 8. The space separating the presser members 7 from the presser members 8 along the strands 1a and 2a is such that the tubing of at least in part thermoplastic material 9 filled with material and brought between said strands 1a and 2a is carried along and gradually held between the members 7 and 8 while its walls are brought gradually into intimate contact with one another. The material contained in the tubing is a fluid substance and is at a given moment urged completely away to either side of the pressed parts.

The presser members 7 and 8 are guided respectively in their travel along the strands 1a and 2a by guiding slopes 10 and 11 on which they bear, said slopes being substantially parallel to the strands 1a and 2a.

The machine may include means for heating the presser members 7 and 8 when said members arrive at a point in their travel between the parallel strands 1a and 2a and whereby the walls of the tubing have been brought into intimate contact with one another after the contents of the tubing, the fluid substance, have been driven away to either side of the pressed parts, said heating being provided to weld the walls of the tubing at the parts required.

Obviously, according to the nature of the at least in part thermoplastics tubing, the heating necessary for welding may be created by any appropriate means.

In the example illustrated in FIGURE 1, however, the heating of the pressed part of the tubing by the presser-members is executed by electrical means in the present case by high frequency current. The presser members are made of electrically conductive material and form the electrodes. The guiding slopes 10 and 11 are insulated but included in each is a metal plate 12 or 13 connected respectively with the poles of the generator of high frequency current, whereby when two corresponding presser members arrive simultaneously in contact with said metal plates, they are inserted in the electric circuit. However, in order to avoid the formation of sparks when the presser members enter into engagement with the metal plates 12 and 13 or move out of engagement with reference thereto, it is desirable that the electrical contact be established only when the mechanical contact has been perfectly and completely established between the presser members and the metal plates. To this purpose, each presser member is rigid with a cam or pusher member 14 (FIGS. 10, 11 and 12) that acts upon a switch 15 inserted in the electric circuit so as to close the circuit only when the presser member 7 is in contact throughout its contacting surface with the metal plate 12 and to open this same circuit before the presser member 7 has reached the end of said metal plate.

FIGURE 10 shows the relative positions of the presser member 7 and of the metal plate 12 at the moment of the closing of the circuit. FIGURE 11 illustrates the relative positions of these same parts during the closing of the circuit. Lastly, FIGURE 12 shows the relative positioning of these parts at the moment at which the circuit is opened again.

When the tube walls that are held pressed together between the presser members 7 and 8 are heated by reason of the electrical field produced by the closing of the circuit, the thermoplastic material forming them softens and becomes adherent so as to provide for the welding of the pressed parts. As a consequence of this softening, the tube or tubing walls that are held pressed together between the presser members offer a less considerable resistance and are flattened to a greater extent between the said presser members.

It is therefore necessary for said presser members to come nearer one another at this moment. In the example illustrated in the drawing, the movement of the presser members 7 and 8 towards one another is effected by the special shape given to the sloping guides 10 and 11.

FIGURES 2 and 3 illustrate diagrammatically in cross-section the action of the profile of the slopes 10 and 11 on the presser members 7 and 8.

Each presser member is constituted chiefly by an electro-conductive part 7a that constitutes the actual presser part of the presser members and that is held in position by a tensioned spring 16 housed within a casing 17. As long as the presser member bears against the part of the sloping guide 10, the spring 16 has no further part to play than that of holding in position the part 7a of the presser member. But when the presser member reaches the portion of said slope that includes the metal portion connected electrically with the current generator, the spring 16 is compressed and the part 7a of the presser member exerts then on the wall of the tube a pressure that is equal to the strength of the spring 16 (FIGURE 3).

It is necessary to limit the movement of the presser members 7 and 8 towards one another in order to prevent them on the one hand from exerting a pressure that is too considerable on the tube and, on the other hand, from coming into contact with one another and producing a short circuit. To this end, the presser members of at least one of the conveyor members are provided laterally (as shown in FIGURES 5, 6 and 7) with stops 18 of insulated material the thickness of which defines the minimum spacing between the members 7 and 8. Said spacing may moreover be adjusted by means of a screw 19 if the stop is carried slidingly on the presser member, as illustrated in FIGURE 7.

In order to keep during the heating operation the contents of the tube away from immediate proximity of the heated part that is consequently soft and in order to cut out thus any risk of the tube breaking as a consequence of the tension prevailing within the closed portion of the tubing, the front and rear surfaces of the presser members may be provided with insulated parts 7b (FIGURES 2, 3 and 4) adapted to slide over the said surfaces against the action of the springs 7c so as to engage the tube to either side of the heated softened part lying between the electro-conductive parts 7a of the presser members.

It is essential furthermore for the proper operation of the machine that the presser members 7 of one of the conveyor members should register exactly with the corresponding presser member 8 of the other conveyor member, cutting out any sliding of one of them with reference to the other chiefly in the direction of the progression of the tube. To this purpose, the members 8 for instance are provided laterally with guides 20 (FIGURES 8 and 9) assuming a flaring shape and allowing the corresponding members 7 to be fitted exactly in register with the members 8 and to hold them in position during their travel along the parallel strands of the conveyor members. Obviously, if electric current is used as heating means, said guiding members 20 should be made of insulating material or else they should be insulated with reference to the body of the presser member.

In the example illustrated in the drawing, the pressure exerted on the pressed portions of the tube is generated by means of mechanical arrangements. It should however be understood that the mechanical arrangements may be replaced by pneumatic, hydraulic, electro-magnetic, electro-mechanical or like arrangements, and it is possible to provide for an increase of said pressure at the point where welding is to be performed, for instance by means of cams controlling at the desired moment the opening or the closing of auxiliary pneumatic or hydraulic circuits, or else through the operation of electro-magnetic relays.

The machine also includes an arrangement providing for the cutting of the welded parts of the tube with a view to the formation of separate containers, said cutting being performed preferably while the welded parts of the tube are still held under pressure between the presser members. To this purpose, a cutter 2L (FIGURES 2, 3 and 4) is housed in a slot 21a of one of the presser members, 7 for instance, said cutter being held normally in its non-operative position inside said slot. A cam 23 positioned in the path of the travel of one of the presser members 7 beyond the point at which the tube is welded, constrains the cutter 21 to move out of its recess and to engage a corresponding slot 24 provided in the corresponding pressing member 8 so as to cut the welded portion of the tube that is still held pressed between the presser members 7 and 8. A return spring 22 returns the cutter 21 into its starting position after it has passed over the cam 23.

What is claimed is:

1. A machine for the continuous production of pliable, filled and airtightly sealed containers formed from a tubing made at least in part of a thermoplastic material, comprising a pair of opposed endless conveyors both of which are adapted to advance continuously at the same speed and in constant direction, both of said conveyors including a continuous strand, one strand of one conveyor being parallel to the cooperating strand of the other conveyor at least along a fraction of their length, rigid complemental pressing and electrical heat generating means secured to each conveyor and being spaced apart in opposed pairs along the runs of said conveyors at distances equal to the length of a container to be formed, a source of electrical energy in circuit with opposed pairs of said rigid pressing and heat generating means, pressure means associated with a portion of the opposed parallel runs of said conveyor strands to urge a pair of said opposed rigid pressing and heat generating means together upon a filled length of at least in part thermoplastic tubing to displace the contents of the tubing and bring the inner walls of said tubing into contact, and thereafter to exert pressure on said contacting walls, means operatively connected to said rigid pressing means for generating heat in said pressing means for welding the pressed parts of said tubing during the movement thereof, means for maintaining said pressing means in pressure contact with said tubing for a length of travel of the filled tubing greater than the length of an individual container that is formed during the pressing operation, and a cutter member normally disposed inside one of each pair of said registering pressing means, means for urging said cutter member into a corresponding slot in the other registering pressing means through the welded part of the tubing held between said pressing means to sever said welded part of the tubing, said urging means including a cam located beyond the point at which the tubing is welded.

2. An apparatus for continuously producing fluid filled containers or packages from an elongated tubing of a thermoplastic material or of material impregnated or coated with a thermoplastic by compressing and sealing together opposite sides of the tubing along narrow zones disposed transversely to the longitudinal axis of the tubing which includes a machine through which the fluid filled tubing may be moved, comprising a pair of endless conveyors one of each being at opposite sides of the path of travel of the tubing each conveyor path being substantially parallel to the path of travel of the fluid filled tubing, means for driving said conveyors simultaneously and at the same rate of linear speed, and cooperating means carried by the conveyors for pressing narrow transverse zones of the opposite sides of the fluid filled tubing into engagement and sealing the same together, said cooperating means comprising a set of clamping jaws supported upon each conveyor and extending towards the other conveyor of the pair at said opposed runs of the respective conveyors, the several jaws of each set being spaced apart to align with complementary jaws of the other set to shape by flattening said tubing and press the opposite sides thereof into engagement, means associated with the jaws of one set to effect a fused seal between the inner walls of the tubing pressed therebetween, and means to increase the pressure between a pair of cooperating jaws during travel thereof along said opposed parallel runs of the respective conveyors and the pairs of the clamping jaws are so dimensioned that a succeeding pair of clamping jaws begins the shaping operation before the immediately preceding pair of clamping jaws has completed its shaping movement.

3. A machine for the continuous production of pliable, filled and airtightly sealed containers formed from a tubing made at least in part of a thermoplastic material, comprising a pair of opposed endless conveyors both of which are adapted to advance continuously at the same speed and in constant direction, both of said conveyors including a continuous strand, one strand of one conveyor being parallel to the cooperating strand of the other conveyor at least along a fraction of their length, rigid complemental pressing and electrical heat generating means secured to each conveyor and being spaced apart in opposed pairs along the runs of said conveyors at distances equal to the length of a container to be formed, a source of electrical energy in circuit with opposed pairs of said rigid pressing and heat generating means, pressure means associated with a portion of the opposed parallel runs of said conveyor strands to urge a pair of said opposed rigid pressing and heat generating means together upon a filled length of at least in part thermoplastic tubing to displace the contents of the tubing and bring the inner walls of said tubing into contact, and thereafter to exert pressure on said contacting walls, means operatively connected to said rigid pressing means for generating heat in said pressing means for welding the pressed parts of said tubing during the movement thereof, means for maintaining said pressing means in pressure contact with said tubing for a length of travel of the filled tubing greater than the length of an individual container that is formed during the pressing operation, said last-named means comprising guiding members that are located in substantial parallel relation on said strands, said pressing means on said conveyer members being electrically conductive and engaging conductive portions of said guiding members as the pressing means move therealong the remaining portions of said guiding members being insulated, and said conductive portions of the guiding members for said strands being inserted in a common operative circuit, a pusher member on each pressing means on at least one strand, and a switch located in said common operative circuit and actuated by said pusher member to close said circuit only when the pressing means have entered into complete mechanical contact with the cooperating conductive portions of the guiding members, and to open said circuit before the said pressing means have reached the end of the corresponding conductive portions.

4. A machine for the continuous production of pliable, liquid-filled and airtightly sealed containers, formed from a tubing made at least in part of a thermoplastic material and which is filled with the liquid to be packaged, comprising a pair of opposed endless conveyors each comprising a continuous conveyor member mounted to move in a loop-shaped path with runs of the two conveyor members extending in opposed relationship, a plurality of pressing members extending transversely across and secured to each of the conveyor members at equally spaced distances from one another, means for driving both conveyor members simultaneously so that said opposed runs move in the same direction and at the same linear speed from the inlet end of the conveyors to the outlet end thereof and with the spaced pressing members on one conveyor member disposed directly opposite to the spaced pressing members on the other conveyor member, guiding means, operative while the conveyors are being driven, for moving the opposed pairs of pressing members on said runs of the conveyor members progressively closer together from a spaced apart relationship at said inlet end of the conveyors where a liquid-filled tubing is introduced therebetween to an intermediate position between said inlet and outlet ends of the conveyors at which the opposed pairs of pressing members are close together and press therebetween said tubing and bring the inner walls of said tubing into contact, said guiding means maintaining the pressing members pressed together during further movement beyond said intermediate position for a length of travel exceeding the spacing between adjacent pressing members on a conveyor member whereafter the pressing members of each pair move apart at said outlet end of the conveyors, electrically energized means for heating the parts of the tubing pressed together between opposed pairs of pressing members and sealing together the contacting wall thereat, and regulating means controlling the energization of said heating means for each pressed part of the tubing for a part only of the period during which said pressed part is pressed between its associated pair of pressing members and stopping said energization before said associated pressing members complete the said length of travel beyond said intermediate position and move apart.

5. A machine for the continuous production of pliable, liquid-filled and airtightly sealed containers, formed from a tubing made at least in part of a thermoplastic material and which is filled with the liquid to be packaged, comprising a pair of opposed endless conveyors each comprising a continuous conveyor member mounted to move in a loop-shaped path with runs of the two conveyor members extending in opposed relationship, a plurality of pressing members extending transversely across and secured to each of the conveyor members at equally spaced distances from one another, means for driving both conveyor members simultaneously so that said opposed runs move in the same direction and at the same linear speed from the inlet end of the conveyors to the outlet end thereof and with the spaced pressing members on one conveyor member disposed directly opposite to the spaced pressing members on the other conveyor member, guiding means, operative while the conveyors are being driven, for moving the opposed pairs of pressing members on said runs of the conveyor members progressively closer together from a spaced apart relationship at said inlet end of the conveyors where a liquid-filled tubing is introduced therebetween to an intermediate position between said inlet and outlet ends of the conveyors at which the opposed pairs of pressing members are close together and press therebetween said tubing and bring the inner walls of said tubing into contact, said guiding means maintaining the pressing members pressed together during further movement beyond said intermediate position for a length of travel exceeding the spacing between adjacent pressing members on a conveyor member whereafter the pressing members of each pair move apart at said outlet end of the conveyors, electrically energized means for heating the parts of the tubing pressed together between opposed pairs of pressing members and sealing together the contacting walls thereat, regulating means controlling the energization of said heating means for each pressed part of the tubing for a part only of the period during which said pressed part is pressed between its associated pair of pressing members and stopping said energization before said associated pressing members complete the said length of travel beyond said intermediate position and move apart, and spacer means cooperating with said pairs of pressing members to maintain a minimum spacing therebetween when the pressing members are pressed together.

6. A machine for the continuous production of pliable, liquid-filled and airtightly sealed containers, formed from a tubing made at least in part of a thermoplastic material and which is filled with the liquid to be packaged, comprising a pair of opposed endless conveyors each comprising a continuous conveyor member mounted to move in a loop-shaped path with runs of the two conveyor members extending in opposed relationship, a plurality of pressing members extending transversely across and secured to each of the conveyor members at equally spaced distances from one another, means for driving both conveyor members simultaneously so that said opposed runs move in the same direction and at the same linear speed from the inlet end of the conveyors to the outlet end thereof and with the spaced pressing members on one conveyor member disposed directly opposite to the spaced pressing members on the other conveyor member, guiding means, operative while the conveyors are being driven, for moving the opposed pairs of pressing members on said runs of the conveyor members progressively closer together from a spaced apart relationship at said inlet end of the conveyors where a liquid-filled tubing is introduced therebetween to an intermediate position between said inlet and outlet ends of the conveyors at which the opposed pairs of pressing members are close together and press therebetween said tubing and bring the inner walls of said tubing into contact, said guiding means maintaining the pressing members pressed together during further movement beyond said intermediate position for a length of travel exceeding the spacing between adjacent pressing members on a conveyor member whereafter the pressing members of each pair move apart at said outlet end of the conveyors, electrically energized means for heating the parts of the tubing pressed together between opposed pairs of pressing members and sealing together the contacting walls thereat, and regulating means controlling the energization of said heating means for each pressed part of the tubing for a part only of the period during which said pressed part is pressed between its associated pair of pressing members and stopping said energization before said associated pressing members complete the said length of travel beyond said intermediate position and move apart each pressing member comprising an outer part adapted to engage the tube and an inner part secured to a conveyor member, with spring means cooperating with said two parts normally to urge the outer part outwardly with respect to the inner part, said guiding means, after moving a pair of opposed pressing members close together to bring the inner walls of the tubing into contact, upon further travel of the conveyors moving the inner parts of said pair of pressing members closer together against the action of said spring means, thereby to increase the pressure with which the contacting walls of the tubing are pressed together while being heated.

7. A machine for the continuous production of pliable, filled and airtightly sealed containers formed out of a tubing made of thermoplastic material or from other materials laminated with thermoplastic sheets or coated with thermoplastic substances, comprising a conveyor consisting of two endless conveyor members, both adapted to advance continuously at the same uniform speed and in constant direction, both of said conveyors including a continuous strand, one strand of one conveyor member being parallel to a cooperating strand of the other conveyor member at least along a fraction of their length, pressing means transversely arranged and secured to each of the conveyor members at distances from one another which are equal to the length of the containers to be produced, said pressing means being adapted to register with one another and with the said strand of one conveyor member and the cooperating strand of the other conveyor member, the distances between the said opposed registering pressure means being such that the walls of the filled tubing introduced between them may gradually be brought into close contact with one another by the movement of the said pressing means towards one another, thereafter, under pressure through said action of said pressing means, the walls of the tubing contact each other, and heat generating means with said pressing means for welding the pressed part of the tubing during the time pressure is maintained on said tubing by said pressing means, said pressure being maintained for a distance of travel of said conveyor members and pressing means greater than the length of an individual container, guiding members for said pressing means along the strands, said members being provided in substantial parallelism with said cooperating parallel conveyor member strands, said pressing means on either conveyor member being electrically conductive and cooperating with corresponding portions of said guiding members that are also conductive and insulated with reference to the remainder of said guiding member, said conductive portions of said guiding members for both strands being inserted in a common operative circuit, a pusher member on at least one of the pressing means of at least one strand adapted to engage a switch in the common operative circuit to close the latter only when the pressing means have entered into complete mechanical contact with the cooperating conductive portions of said guiding members and to open said circuit before the said pressing means have reached the end of the corresponding conductive portions, and means operatively associated with said pressing means and said heat generating means to maintain the pressure on the tubing after electrical energy has been cut off to ensure a fluid-tight seal.

References Cited in the file of this patent

UNITED STATES PATENTS

| | | |
|---|---|---|
| 2,106,740 | Hepke | Feb. 1, 1938 |
| 2,134,862 | Dunnam | Nov. 1, 1938 |
| 2,347,439 | Shea | Aug. 25, 1944 |
| 2,492,530 | Kriegsheim | Dec. 27, 1949 |
| 2,530,400 | Rado | Nov. 21, 1950 |
| 2,702,971 | Brandenberger | Mar. 1, 1955 |
| 2,738,631 | Jarund | Mar. 20, 1956 |
| 2,793,481 | Rado | May 28, 1957 |